(12) United States Patent
Pietryga et al.

(10) Patent No.: US 6,447,054 B1
(45) Date of Patent: Sep. 10, 2002

(54) VEHICLE ACCESS SYSTEM

(75) Inventors: Brad L Pietryga, Shelby Township; Leon F. Van Eden, Troy, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/655,121

(22) Filed: Sep. 5, 2000

Related U.S. Application Data (60) Provisional application No. 60/177,990, filed on Jan. 25, 2000.

(51) Int. Cl.[7] .................. B60J 7/00; B60K 37/00; B60N 2/00; B60N 3/00; B60R 27/00
(52) U.S. Cl. ............... 296/202; 296/146.1; 296/146.12
(58) Field of Search ............................ 296/202, 146.1, 296/146.12; 49/248

(56) References Cited

U.S. PATENT DOCUMENTS

| | | | |
|---|---|---|---|
| 3,051,280 A | 8/1962 | Bergman et al. ............... 189/46 |
| 3,074,755 A | 1/1963 | Peras ........................... 296/44 |
| 4,025,104 A | 5/1977 | Grossbach et al. ......... 296/155 |
| 4,110,934 A | 9/1978 | Zens ........................... 49/218 |
| 4,135,760 A | 1/1979 | Grossbach .................. 296/155 |
| 4,157,846 A | 6/1979 | Whitcroft .................... 296/155 |
| 4,505,500 A | 3/1985 | Utsumi et al. ................ 292/48 |
| 4,561,690 A | 12/1985 | Shinjo et al. ................ 296/155 |
| 4,603,900 A | * 8/1986 | Dodgen |
| 5,244,247 A | 9/1993 | Kuwabara ............... 296/146.12 |
| 5,398,988 A | 3/1995 | DeRees et al. ............. 296/155 |
| 5,491,875 A | 2/1996 | Siladke et al. ................. 16/346 |
| 5,632,065 A | 5/1997 | Siladke et al. ................. 16/335 |
| 5,871,255 A | 2/1999 | Harland et al. ............. 297/257 |
| 6,030,025 A | 2/2000 | Kanerva ................ 296/146.12 |
| 6,129,404 A | * 10/2000 | Mattarella et al. |

FOREIGN PATENT DOCUMENTS

FR          2700505          1/1993

OTHER PUBLICATIONS

Automotive News, "From 4-door to more-door", p. 1, Mar. 27, 2000.

* cited by examiner

*Primary Examiner*—Stephen T. Gordon
*Assistant Examiner*—Scott Carpenter
(74) *Attorney, Agent, or Firm*—Laura C. Hargitt (57) ABSTRACT

A vehicle access system includes an access opening for the passenger compartment that is closed by a swinging door in combination with an articulating door. The articulating door moves through an arc without angling away from the vehicle body and is supported on a hinge assembly that attaches near the center of the door. An arm assembly guides the door throughout its range of positions and maintain the door in an orientation that is substantially parallel to the vehicle body. When the doors are open, an uninterrupted access opening is provided to the area of the second and third seat rows of the vehicle.

18 Claims, 7 Drawing Sheets

VEHICLE ACCESS SYSTEM

This application claims priority from U.S. Provisional Application Serial No. 60/177,990 filed Jan. 25, 2000.

TECHNICAL FIELD

The present invention relates to vehicle access and more particularly, to a door system that improves vehicle accessibility in general but especially in the cases of vehicles with multiple rows of passenger seats and vehicles with a rear storage area.

BACKGROUND OF THE INVENTION

Vehicle accessibility has been an ever present design challenge since modes of human transportation began using enclosed bodies. Countless closure mechanisms have been invented to solve the persistent problem. The factors influencing the solution that is available for a given vehicle include exterior styling, interior usage, opening size, location of the opening on the vehicle body, and many others. In the case of side door openings on a typical multi-passenger vehicle, the generally used solution is to employ a single closure that is separated from any adjacent closures by a pillar. Each closure has two single pivoting hinges placed at the front or rear end of the door to swingingly connect the door to the body, with both hinges supporting the weight of the door. A commonly used rule of thumb is to place the hinges with at least fifteen inches of separation to control gaps. Generally, a single latch is used at the opposite end of the door from the hinges to releasably hold the door in a closed position on the body.

Apart from the generally employed closure scheme, other means that have been developed include the double pivot door hinge of U.S. Pat. No. 5,632,065 and the double latching mechanism of U.S. Pat. No. 4,561,690. Both of these options have been used in the context of a double door closure scheme without a central opening pillar. That type of a system has been recognized as advantageous from an accessibility convenience standpoint. In spite of those references, the generally pursued option for closures on vehicles with multiple rows of seats has been to provide single doored openings with standard type hinges and to provide a means of manipulating the seats to aid in access. A reference showing that type of solution is U.S. Pat. No. 5,871,255.

Summarizing, the state of the art presently teaches that most vehicles include side doors that pivotably open on twin hinges that are connected to the vehicle body. Further, when multiple side doors are employed, all doors usually open in the same general direction. A well known exception is van type vehicles that commonly include sliding rear side doors to improve accessibility to multiple rows of rear seats. That system is much like the one used in the '690 Patent referenced above, (with a center pillar). Therefore, in the design process, if one were to stray from the common swinging door scheme, the prior art provides strong motivation for employing sliding rear doors. Venturing beyond that option remains unpredictable.

SUMMARY OF THE INVENTION

Aspects of the invention reside in a vehicle access system that facilitates entering and reaching into the area behind a seat by providing unique features to a side opening and its associated closure.

Preferred exemplary embodiments of the present invention described here as an aid in readily conveying the nature of the invention, include a vehicle with a body that defines a passenger compartment having an access opening to the passenger compartment and having a rear wheel opening. A first door is openably connected to the body and closes a forward portion of the access opening. A second door having a lower extension is connected to the body and closes a rearward portion of the access opening. The second door is movable to an open position wherein in the open position the second door is substantially parallel to the body. When the second door moves to the open position, the lower extension is entirely outboard from the wheel opening.

The preferred exemplary embodiments also include a vehicle with a body defining a passenger compartment and having a rocker, a roof, and a rear wheel opening. First, second and third rows of seats are positioned in the passenger compartment. The body includes a floor that has a low floor area under the first and second rows of seats at a first height that is substantially at the rocker, and the floor includes a high floor area under the third row of seats that is at a second height that is substantially above the rocker. A pillar extends from the rocker to the roof. A first door is positioned on a side of the body forward of the pillar and a second door positioned on the side of the body rearward of the pillar. A third door is positioned on the side of the body rearward of the second door, when closed, the third door extending rearward over the rear wheel opening and beyond the low floor area so that a unitary opening closed by the second and third doors extends rearward beyond the back of the second row of seats.

The numbered claims found at the conclusion of this specification particularly and distinctly define the subject matter of the invention per se.

BRIEF DESCRIPTION OF THE DRAWINGS

The present invention will now be described by way of example, with reference to the accompanying drawings in which.

DESCRIPTION OF THE PREFERRED EMBODIMENT

The vehicle access system of the present invention is disclosed in a preferred embodiment that is in essence a "six-door" vehicle. The fifth and six doors cooperate with the third and fourth doors respectively, to close relatively large side openings and employ an articulating hinge concept. The enlarged side openings provide convenient access to the second and third seat row areas for both passenger and cargo uses.

Figure 1:
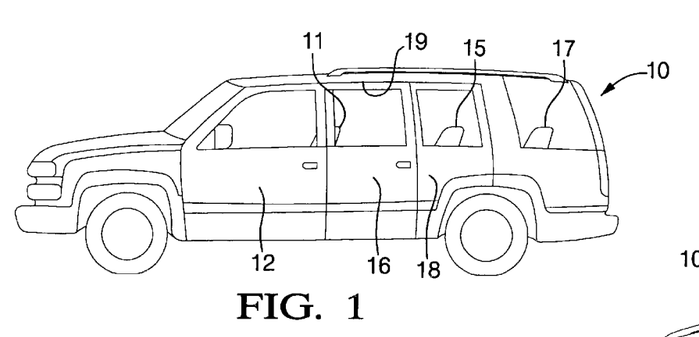
FIG. 1 is a side elevation of a vehicle including the access system of the present invention.
Figure 2:
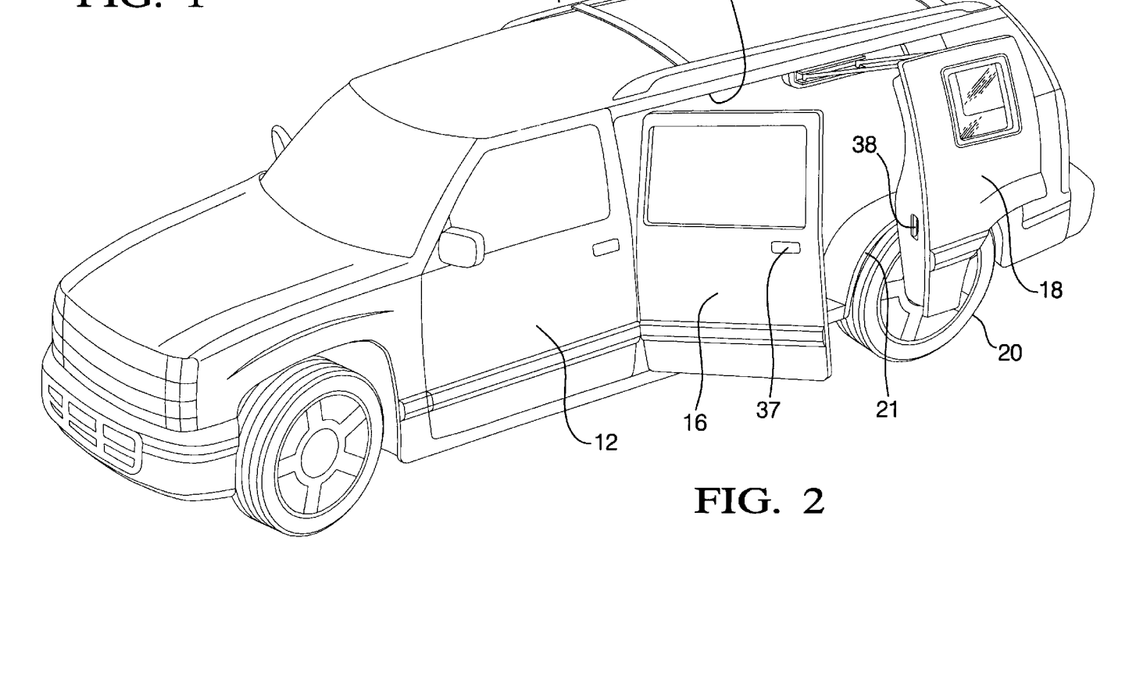
FIG. 2 is a perspective view of the vehicle of FIG. 1 with the access system in an open condition.

Referring to FIG. 1, vehicle 10 includes a passenger compartment in its interior with a front or first row of seats 11 for carrying a driver and other passenger(s) that is accessed in a conventional manner by a swinging front door 12. A similar door (not shown), is provided on the opposite side of the vehicle 10. The front door 12 opens generally outwardly and forwardly in a swinging action, pivoting about a pair of hinges in a conventional manner. A second row of seats 15 and a third row of seats 17 are accessed through a combination of a rear door 16 and an access door 18. The rear door 16 and the access door 18 together close a single uninterrupted opening 19 in the vehicle 10. A similar pair of doors (not shown), are provided on the opposite side of the vehicle 10 so that there is a total of six side doors. The rear door 16 opens generally outwardly and forwardly in a swinging action, pivoting about a pair of hinges in a conventional manner, which is demonstrated in FIG. 2. The access door 18 opens generally rearwardly and outwardly as shown in FIG. 2 in an articulating action. In the illustrated open position, the access door 18 is substantially parallel to the vehicle 10, rather than being positioned at an angle thereto like the doors 12 and 16.

FIG. 2 shows the uninterrupted opening 19 with the doors 16 and 18 in an open position. Uninterrupted opening 19 extends along the side of vehicle 10 from a point near the rear of front door 12 to a point over the area near the center of wheel 20, including along approximately half the length of the perimeter of the rear wheel house opening 21. No vertical pillar is provided at the juncture between doors 16 and 18. As can be seen from FIG. 2, the combination of doors 16 and 18 provides a large convenient opening for accessing the interior of vehicle 10. Because the door 16 is relatively short in width for the size of the opening 19, and because the door 18 moves to the open position without angling relative to the vehicle 10, the rear of vehicle 10 is easily accessed within the often tight quarters of a typical parking lot space. The door 12 being wider than the door 16, door 16 can swing open to a larger angle if desired. To access the passenger compartment from outside the vehicle 10, the door 16 is first opened by using handle 37 and swinging the door 16 outwardly and forwardly, and then the handle 38 may be reached to open door 18, allowing articulation of the door 18 rearwardly and outwardly. During its travel, door 18 remains substantially in the same orientation relative to the vehicle 10, meaning it doesn't pass through a range of angular orientations relative to the vehicle body as does the door 16, but rather continues to face substantially the same direction away from the vehicle 10.

Figure 3:
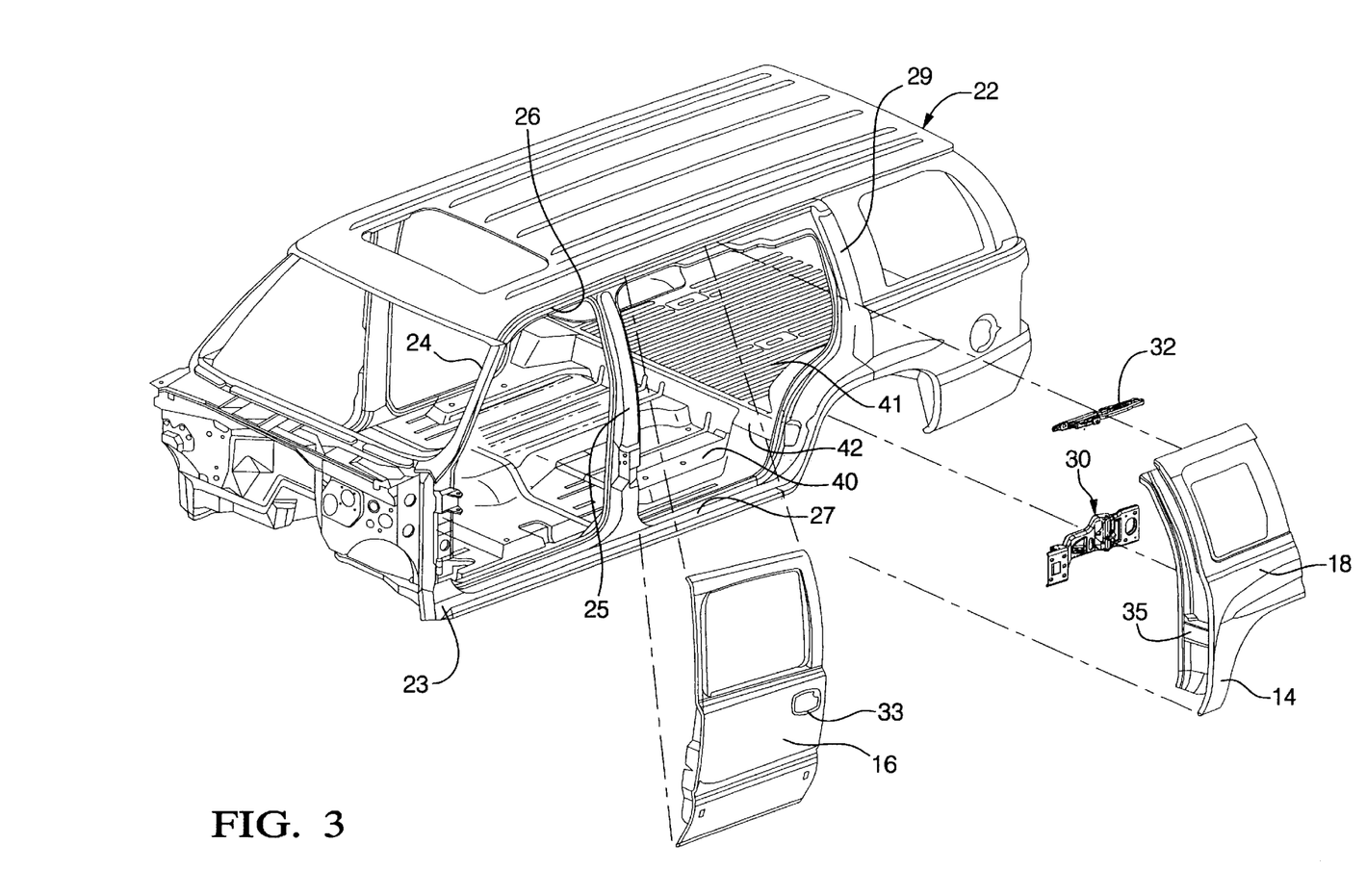
FIG. 3 is a fragmentary perspective exploded view of the vehicle of FIG. 1 showing the principle sheet metal components.

Referring to FIG. 3, the principle sheet metal components of the access system are shown. The body 22 includes a front door opening 23 that extends between the A-pillar 24 and the B-pillar 25 in the vehicle's longitudinal direction and between the roof panel 26 and the rocker panel 27 in the vertical direction. Body 22 also includes uninterrupted opening 19 that extends between the B-pillar 25 and the C-pillar 29 in the vehicle's longitudinal direction and between roof panel 26 and rocker panel 27 in the vertical direction. The body 22 includes a floor pan with a low floor area 40 that varies slightly in height but is generally substantially at the level of the rocker panel 27. As can be seen from FIG. 1, the seat rows 11 and 15 are positioned on the low floor area 40. A high floor area 41 at a height substantially above the rocker panel 27 is provided to the rear of the vehicle 10, behind a wall 42 that extends between the floor areas 40, 41.

As can be seen from FIG. 1, the seat row 17 is positioned on the high floor area 41. The uninterrupted opening 19 extends rearward beyond the wall 42, and therefore, beyond the back of the seat row 15. The forward portion of the uninterrupted opening 19 receives the primary rear door 16, which includes an opening 33 that receives a release handle assembly (not shown), that is accessible from outside the vehicle 10. The rearward portion of the uninterrupted opening 19 receives the access door 18, which includes an opening 35 for receiving a release handle assembly (not shown), that is accessible only after the rear door 16 is opened. Access door 18 includes a lower extension 14 having a vertical length that is substantially greater than its width along the longitudinal direction of the vehicle 10. Access door 18 is connected to the body of vehicle 10 by a hinge assembly 30 and an arm assembly 32, which are also illustrated in FIG. 4 in the closed position.

Figure 4:
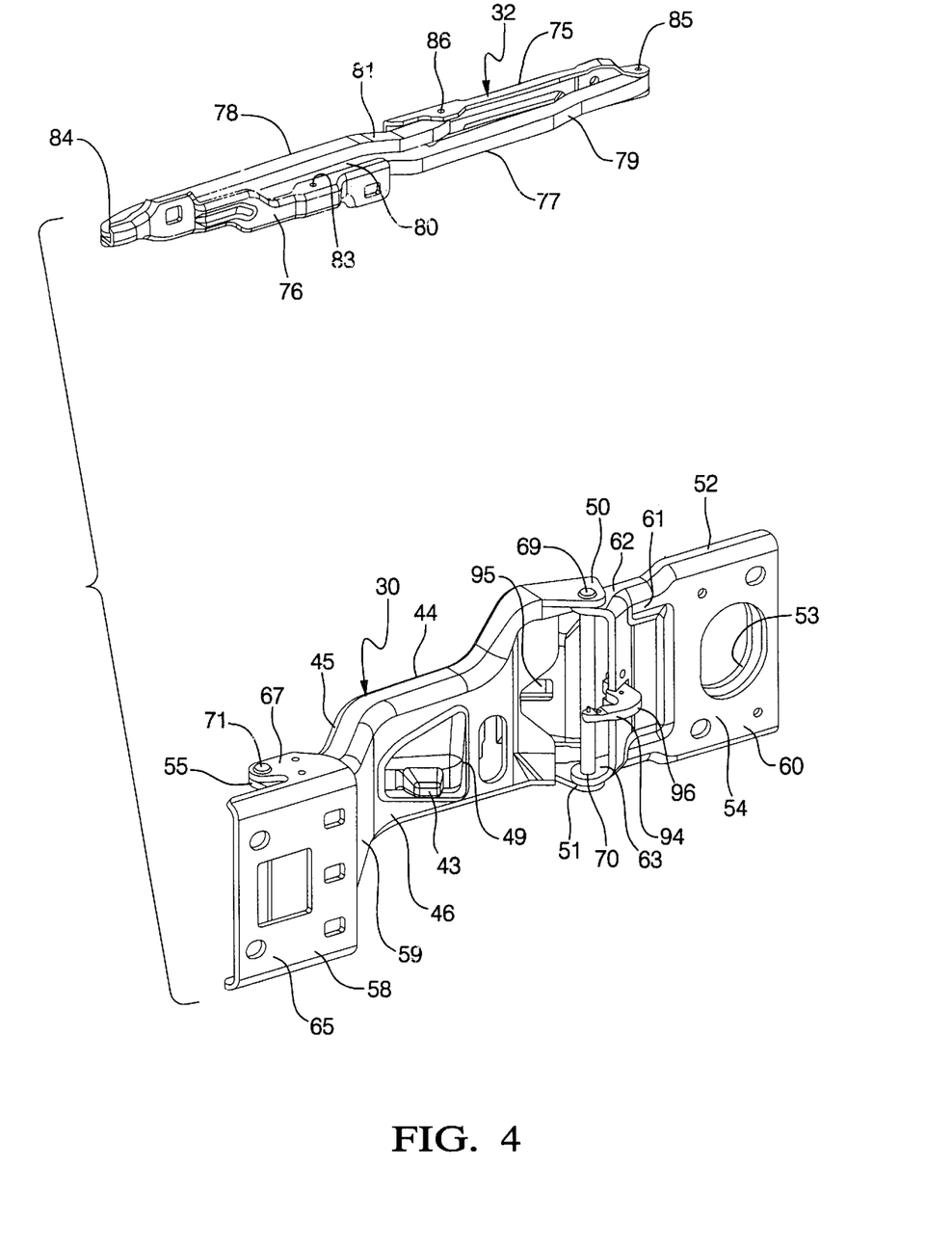
FIG. 4 is a detail view of the hinge system of the vehicle of FIG. 1 in the closed position.

Referring to FIG. 4, the hinge assembly 30 mechanically links the access door 18 to the vehicle 10 and includes a central support link 44 comprising a pair of metal stampings 45 and 46 welded together at upper and lower edges to form a box section and that serves to hold the door 18 in proper position, bearing the stress imposed thereby. Stamping 45 includes a pair of arms 50, 51 bent at approximately ninety degrees and pointing outboard when the hinge assembly 30 is in the closed position shown, each arm pivotably connected to a strap 52. Stamping 46 similarly includes a pair of arms 55, 56 (shown in FIG. 7), bent at approximately ninety degrees and pointing inboard when the hinge assembly 30 is in the closed position shown, each arm pivotably connected to a strap 58. The hinge assembly 30 includes an offset 59, which places the strap 58 further outboard than the strap 52. A boss 49 is formed on the outboard side of stamping 46 adjacent the offset 59 and carries an overslam bumper 43 made of a resilient material. Also shown is a detent assembly 94 including cup 95 and co-acting arm 96.

In greater detail, strap 52 includes a substantially flat mounting segment 60 that contains a plurality of mounting holes, and an offset segment 61 that includes a pair of flanges 62, 63 that are pivotably connected to the arms 50, 51. The flanges 62, 63 extend inboard, nesting inside the arms 50, 51. The body of strap 52 is formed from a pair of stampings 53, 54 welded together at upper and lower edges to form a box section structure. The strap 58 includes a substantially flat mounting segment 65 containing a plurality of mounting holes with a pair of arms 67, 68 (shown in FIG. 7), extending inboard, hooking forwardly and pivotally connecting to the arms 55, 56. Arms 67, 68 overlie the arms 55, 56, which also extend in an inboard direction. Two pivot axis are defined, one by the pinned points 69 and 70 at the connection between support link 44 and strap 52, and one by pinned points 71 and 72 (shown in FIG. 7), at the connection between the support link 44 and the strap 52. In the closed position, the axis at strap 58 is a minimum of 30 millimeters, outboard from the axis at strap 52. The overslam bumper is located midway between the pivot axes.

Also shown in FIG. 4 in the closed position, is arm assembly 32, which connects the upper part of access door 18 to vehicle 10 as shown in FIG. 2. Arm assembly 32 includes bracket 75 that attaches to body 22 and bracket 76 that attaches to access door 18. The brackets 75, 76 are each pivotably connected to a pair of arms 77, 78 by pins to form a four-bar linkage system. Arms 77 and 78 are formed as tubular structural members that assist in stiffening the system, particularly during that part of travel that is near the closed position. The arm 77 includes an offset 79 so that its segment 80 nests below the arm 78 for improved packaging.

The arm 78 includes a similar offset 81 so that the arms pivot similarly. In the closed position shown, the pivots 83, 84 are a minimum of 30 millimeters, outboard from the pivots 85, 86, aiding in the initial opening movement of access door 18.

Figure 5:
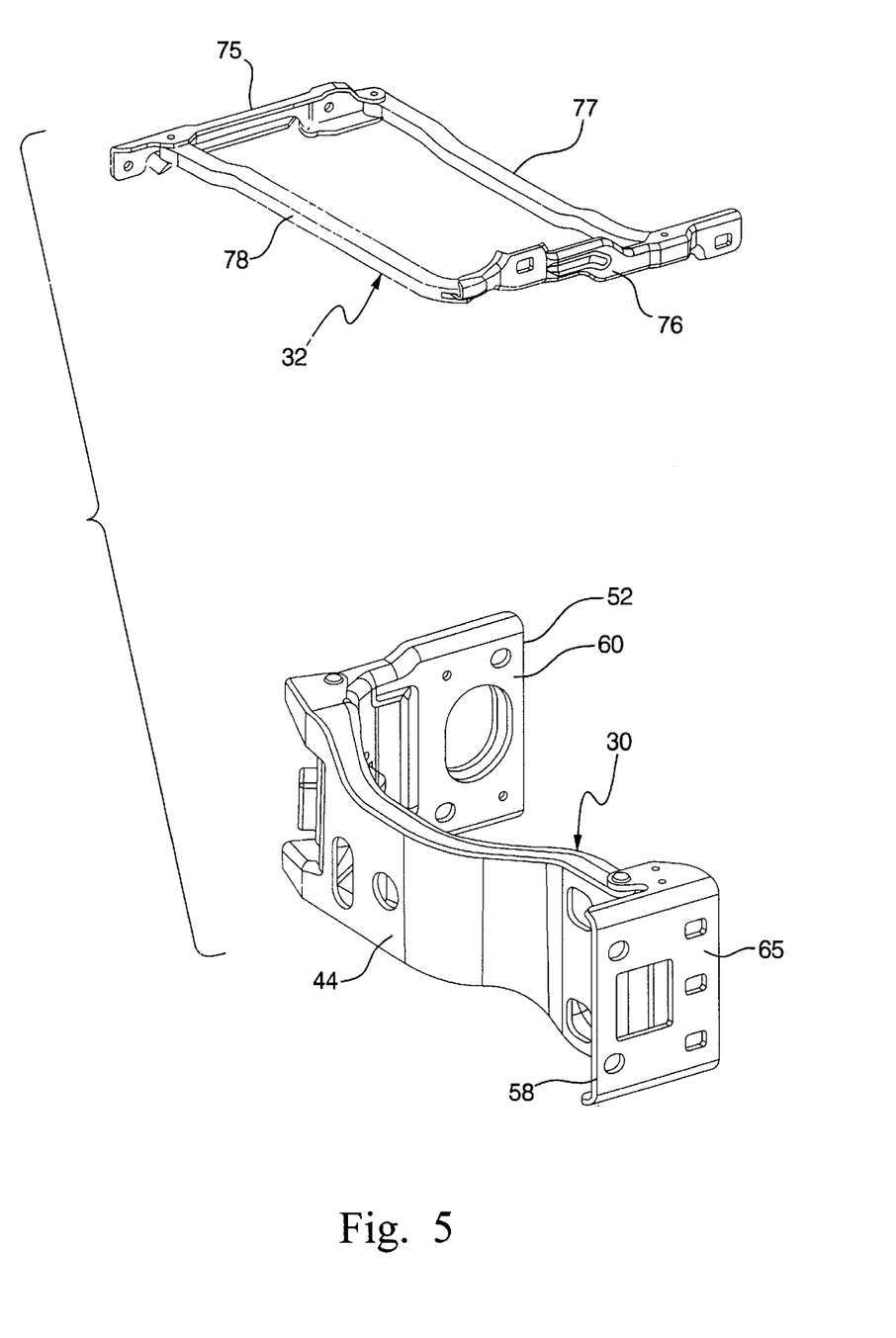
FIG. 5 is a detail view of the hinge system of the vehicle of FIG. 1 in a partially open position.
Figure 6:
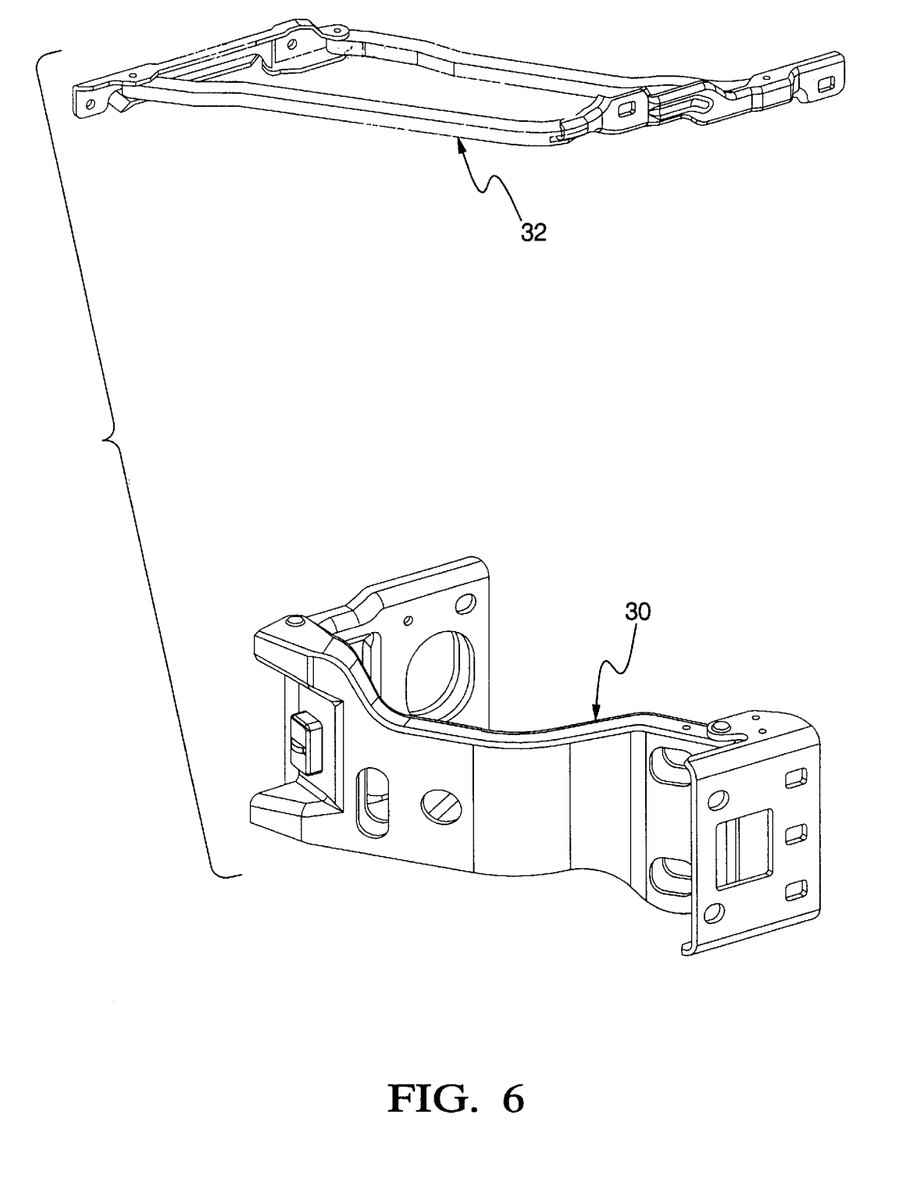
FIG. 6 is a detail view of the hinge system of the vehicle of FIG. 1 in the open position.

Referring to FIG. 5, the hinge assembly 30 and the arm assembly 32 are shown in a partially open position. The pivot lengths of the arms 77, 78 and the support link 44 are equal. The arms 77, 78 guide the movement of bracket 76 and therefore, of the upper part of door 18. The bracket 76 remains parallel to the bracket 75 as it moves in an arc, keeping the mounting segment 65 parallel to the mounting segment 60. FIG. 6 shows the hinge assembly 30 and the arm assembly 32 in the open position, which places the pivot points at the access door 18 along a line that is about 120 degrees from the longitudinal axis of the vehicle, relative to their centerpoints of rotation at the respective pivot points at the vehicle body 22.

Figure 7:
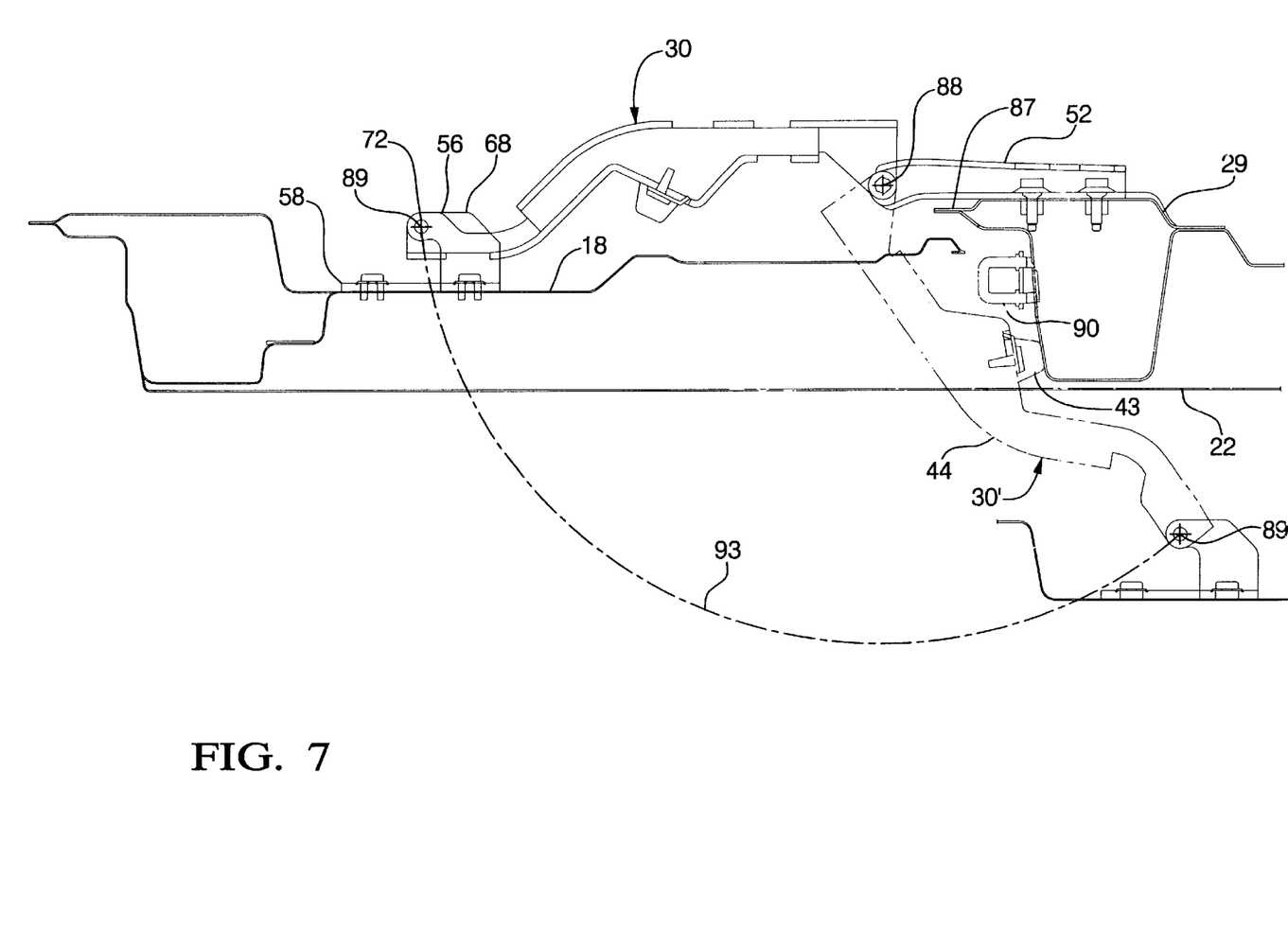
FIG. 7 is a schematic fragmentary cross sectional view of the vehicle access system of FIG. 1 shown in closed and open stop positions.
Figure 8:
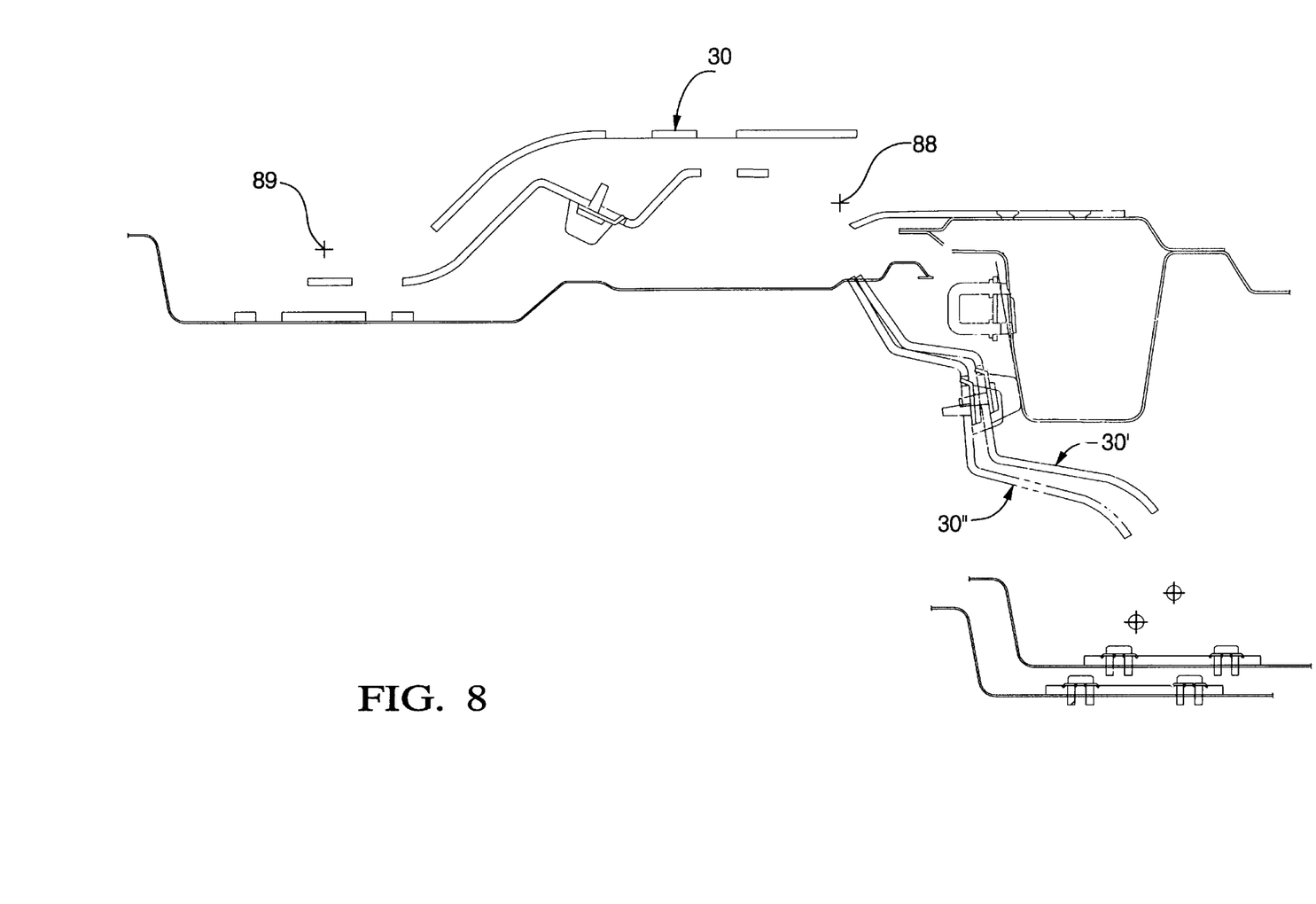
FIG. 8 is a schematic fragmentary cross sectional view of the vehicle access system of FIG. 1 shown in closed, open stop, and open positions.

Referring to FIG. 7, a schematic representation of the movement of hinge assembly 30 is shown in the closed position and at 30' in the open stop position. Strap 52 is fastened to the C-pillar 29 and the strap 58 is fastened to the access door 18. The Strap 52 advantageously attaches inside the seal point of the door system which occurs at flange 87. Pivot center 88 is positioned forward of the flange 87 by strap 52 so that the support link 44 clears during opening movement. In the open stop position, the bumper 43 contacts the body 22 at C-pillar 29 to limit opening movement of the access door 18. Also shown is a striker 90 attached to the C-pillar 29, with its fasteners being accessible through the opening 91 (shown in FIG. 6), of support link 44. Similarly, shown in FIG. 6 is an opening 92 for accessing the fastener that holds the bumper 43 on the hinge assembly 30. During opening movement of the access door 18, the pivot axis 89 moves along an arc 93 about the pivot axis 88, placing the access door 18 at a position along the side of the exterior of body 22 substantially behind the opening 19. As shown in FIG. 8, the normal full open position 30" is slightly short of the open stop position 30' and is defined by the detent assembly 94.

Thus, the invention has been described in a typical manner by referencing at least one specific embodiment of the many that are possible for a vehicle access system. Entering and reaching into an area behind a seat are facilitated by means of an articulating access door concept.

What is claimed is:

1. A vehicle comprising:
    a body defining a passenger compartment having an access opening to the passenger compartment and having a rear wheel opening with a center point;
    a first door openably connected to the body and closing a forward portion of the access opening; and
    a second door connected to the body and closing a rearward portion of the access opening, the second door having a lower extension;
    wherein the second door is pivotably mounted to the body by a mechanical link and moves outwardly and rearwardly through an arcuate path from a closed to open position while maintaining a substantially parallel relationship to the body, and further wherein the movement of the second door from the closed to open position does not include a sliding motion and
    wherein the second door moves to the open position, the lower extension is entirely outboard from the wheel opening.

2. A vehicle according to claim 1 wherein the body includes a pillar defining a forward perimeter edge of the access opening and further comprising a front door positioned forward the pillar.

3. A vehicle according to claim 1 wherein the body includes a rocker and a roof and wherein the second door extends substantially from the rocker to the roof.

4. A vehicle according to claim 3 wherein the second door is mounted to the body by the mechanical link at an upper end of the second door.

5. A vehicle according to claim 1 wherein the lower extension has a length and a width and wherein the length is substantially greater than the width.

6. A vehicle according to claim 1 further comprising a handle on the second door wherein the handle is the sole means of opening the second door and wherein the handle is accessible from outside the body only when the first door is open.

7. A vehicle according to claim 1 further comprising a first row of seats positioned in the passenger compartment, a second row of seats positioned in the passenger compartment behind the first row of seats and a third row of seats positioned in the passenger compartment behind the second row of seats, the body including a floor, wherein the floor includes a low floor area that is at a first height under the first and second rows of seats and the floor includes a high floor area that is at a second height under the third row of seats, with a wall between the low floor area and the high floor area, wherein the second door extends rearward beyond the wall so that the access opening extends rearward beyond the second row of seats.

8. A vehicle comprising:
    a body defining a passenger compartment having an access opening to the passenger compartment and having a rear wheel opening with a center point;
    a first door openably connected to the body and closing a forward portion of the access opening; and
    a second door connected to the body and closing a rearward portion of the access opening, the second door having a lower extension with a forward edge;
    wherein the second door is pivotably mounted to the body by a mechanical link and moves outwardly and rearwardly through an arcuate path from a closed to open position while maintaining a substantially parallel relationship to the body, and further wherein the movement of the second door from the closed to open position does not include a sliding motion and
    wherein when the second door moves to the open position, the forward edge of the lower extension is rearward a distance that is at least near the center point of the wheel opening.

9. A vehicle according to claim 8 wherein the body includes a pillar defining a forward perimeter edge of the access opening and further comprising a front door positioned forward the pillar.

10. A vehicle according to claim 8 wherein the body includes a rocker and a roof and wherein the second door extends substantially from the rocker to the roof.

11. A vehicle according to claim 10 wherein the second door is openably mounted to the body by the mechanical link at an upper end of the second door.

12. A vehicle according to claim 8 wherein the lower extension has a length and a width and wherein the length is substantially greater than the width.

13. A vehicle according to claim 8 further comprising a handle on the second door wherein the handle is the sole means of opening the second door and wherein the handle is accessible from outside the body only when the first door is open.

14. A vehicle according to claim 8 further comprising a first row of seats positioned in the passenger compartment, a second row of seats positioned in the passenger compartment behind the first row of seats and a third row of seats positioned in the passenger compartment behind the second row of seats, the body including a floor, wherein the floor includes a low floor area that is at a first height under the first and second rows of seats and the floor includes a high floor area that is at a second height under the third row of seats with a wall between the low floor area and the high floor area, wherein the second door extends rearward beyond the wall so that the access opening extends rearward beyond the second row of seats.

15. A vehicle comprising:

a body defining a passenger compartment and having a rocker, a roof and a rear wheel opening, with a first row of seats positioned in the passenger compartment, a second row of seats positioned in the passenger compartment behind the first row of seats and a third row of seats positioned in the passenger compartment behind the second row of seats, the body including a floor, wherein the floor includes a low floor area that is at a first height substantially at the rocker under the first and second rows of seats and the floor includes a high floor area that is at a second height substantially above the rocker under the third row of seats;

a pillar extending from the rocker to the roof;

a first door positioned on a side of the body forward of the pillar;

a second door positioned on the side of the body rearward of the pillar;

a third door positioned on the side of the body rearward of the second door, when closed, the third door extending rearward over the rear wheel opening and beyond the low floor area so that a unitary opening closed by the second and third doors extends rearward beyond the back of the second row of seats and wherein the third door is pivotably mounted to the body by a mechanical link and moves outwardly and rearwardly through an arcuate path from a closed to open position while maintaining a substantially parallel relationship to the body, and further wherein the movement of the third door from the closed to open position does not include a sliding motion.

16. A vehicle according to claim 15 wherein the third door is connected to the body by a pivoting hinge.

17. A vehicle according to claim 15 wherein the third door can be opened only after the second door is opened.

18. A vehicle according to claim 15 wherein the third seat is accessible without tilting the second seat when the second and third doors are open.

* * * * *